US012652746B1

(12) United States Patent
Stollenwerk et al.

(10) Patent No.: US 12,652,746 B1
(45) Date of Patent: Jun. 9, 2026

(54) MAGNETICALLY ENHANCED VUV LAMP

(71) Applicant: UCHICAGO ARGONNE, LLC, Chicago, IL (US)

(72) Inventors: Patrick R. Stollenwerk, Chicago, IL (US); Kevin G. Bailey, Wood Dale, IL (US); Michael N. Bishof, Elmhurst, IL (US); Peter Mueller, Woodridge, IL (US); Thomas O'Connor, Chicago, IL (US); Jake C. Zappala, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 343 days.

(21) Appl. No.: 18/445,436

(22) Filed: Aug. 14, 2023

(51) Int. Cl.
*H05H 1/46* (2006.01)

(52) U.S. Cl.
CPC .................................. *H05H 1/461* (2021.05)

(58) Field of Classification Search
CPC ...................................................... H05H 1/461
USPC ......................................................... 313/112
See application file for complete search history.

(56) References Cited

U.S. PATENT DOCUMENTS

2018/0323043 A1* 11/2018 Kraus ............... H01J 37/32238

OTHER PUBLICATIONS

Espacenet Patent Search Complete (Global Dossier) (Year: 2021).*
Kohler et al., All-optical production and trapping of metastable noble-gas atoms down to the single-atom regime, Front. Phys., 108: 13001, (Oct. 2014).
Wang et al., Optical excitation and trapping of 81Kr, Phys. Rev. Lett., 127: 023201, (Jul. 2021).
Heraeus, High quality photoionisation detector lamps (PID), (Jul. 2023).
Resonance Ltd., High power lamps.
Daerr et al., A novel vacuum ultra violet lamp for metastable rare gas experiments, Rev. Sci. Intrum., 82: 073106, (Jul. 2011).

* cited by examiner

*Primary Examiner* — James R Greece
*Assistant Examiner* — Hana S Featherly
(74) *Attorney, Agent, or Firm* — MARSHALL, GERSTEIN & BORUN LLP

(57) ABSTRACT

A method and systems for enhancing the performance of vacuum ultra-violet lamps. The method includes providing a gas to a microwave cavity chamber. The microwave cavity chamber has a length along a central axis of the microwave cavity chamber, a first end along the central axis, and a second end opposite the first end along the central axis. The method further includes providing excitation energy to the microwave cavity chamber and generating a plasma in the microwave cavity chamber. A compensator magnet is disposed toward the first end of the microwave cavity chamber to provide a compensation magnetic field at the first end of the microwave cavity chamber.

20 Claims, 6 Drawing Sheets

MAGNETICALLY ENHANCED VUV LAMP

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for radiation sources, and specifically to improved output of vacuum ultraviolet lamps.

BACKGROUND

Broad-band and narrow-band vacuum ultraviolet (VUV) light is useful for applications across a wide range of fields including semiconductor fabrication, material science, photochemistry, and atomic and molecular spectroscopy. Some applications, such as probing and exciting noble gases and other materials, require narrow-band radiation to be precisely tuned to specific atomic transitions. Typically, low-pressure plasma-discharge based lamp systems are used to provide narrow-band radiation for precise atomic transition applications.

Due to the development of laser manipulation techniques over the past several decades selective trapping and cooling of neutral atoms of noble gases for diverse applications has been enabled for use in fundamental and applied sciences such as Bose-Einstein condensation, cold chemistry, precision spectroscopy, fundamental physics, radiometric dating of ice, and water via noble gas radioisotope tracers. Laser manipulation of noble gases, however, requires excitation to long-lived metastable atomic states that exclusively provide laser-accessible closed-cycle transitions. Therefore, an intrinsic challenge of all of these applications is the production of metastable noble gas atoms which requires high energy excitation sources to cause atomic transition across large energy gaps to excited states (e.g., energies of 8-20 eV). Typically, direct laser excitation is not capable of exciting across such energy gaps. Techniques for metastable gas production have largely relied on non-resonant electron excitation in either DC or RF discharges. Because of competing processes within the radiation sources, such as de-excitation and ionization, metastable production efficiency is typically limited to between $1\times10^{-5}$ and $1\times10^{-4}$ and is strongly dependent on the specific gas density and composition. The metastable efficiency is reported as the fraction of atoms that are successfully converted to the metastable state. Therefore, an efficiency of $1\times10^{-5}$ means that for every $1\times10^{5}$ noble gas atoms in an RF discharge, 1 noble gas atom is successfully excited into the metastable state. A narrow-band VUV light source has the potential to overcome the low-efficiencies and the strong dependence on gas composition and density as it results in resonant excitation of atoms.

Due to the drawbacks of current VUV radiation sources, the use of VUV is limited as discussed above in the application of generating metastable states in noble gases. Methods to improve the output of VUV sources have been attempted, however, these attempts still do not provide sufficient power, are instable over time, and can have shorter operational lifetimes than required for applications. These drawbacks also limit the use of VUV light in applications that require continuous-wave radiation. Due to the broad range of uses of VUV radiation, there is need for VUV sources that allow for the stable generation of high intensity VUV radiation over longer periods of time.

SUMMARY OF THE DISCLOSURE

In an embodiment, disclosed is a system for generating ultra-violet radiation, the system includes a microwave cavity chamber having a first end and a second end. The second end of the microwave cavity chamber is opposite the first end along a central axis of the microwave cavity chamber. The microwave cavity chamber has a gas inlet port disposed toward the first end of the microwave cavity chamber. The gas inlet port is configured to allow fluid flow into the microwave cavity chamber. A gas outlet port is disposed on the microwave cavity chamber toward the second end of the microwave cavity chamber. The gas outlet port is configured to provide fluid flow out of the microwave cavity chamber. An output window is disposed at the first end of the microwave cavity chamber, with the output window configured to transmit radiation generated in the microwave cavity chamber to an environment or region outside of the microwave cavity chamber. A compensator magnet is disposed proximal the first end of the microwave cavity chamber to provide an external magnetic field to the first end of the microwave cavity chamber.

In another embodiment, disclosed is a method for enhancing the performance of vacuum ultra-violet lamps. The method includes providing a gas to a microwave cavity chamber. The microwave cavity chamber has a length along a central axis of the microwave cavity chamber, a first end along the central axis, and a second end opposite the first end along the central axis. The method further includes providing excitation energy to the microwave cavity chamber and generating a plasma in the microwave cavity chamber. A compensator magnet is disposed toward the first end of the microwave cavity chamber to provide a compensation magnetic field at the first end of the microwave cavity chamber.

DETAILED DESCRIPTION

Microwave radiation is useful across a number of applications and industries, including for atomic manipulation and observation. Vacuum ultraviolet (VUV) optical sources, also referred to as VUV lamps, may be used for atom trap trace analysis (ATTA) as described herein. The disclosed VUV lamp includes external magnetic fields near an exit window of the lamp to enhance output intensity and plasma mode stability. Typical VUV lamp performance degrades by 50% or more over several days of operation. The disclosed VUV lamp exhibits no measurable loss of transmission over more than 160 hours of lamp operation time. The enhanced lifetime may be due to the isolation of plasma from metal surfaces and from maintaining a continuous flow of lamp gas away from an output window surface. The enhancement of the lamp by the inclusion of external magnetic fields provides an improved VUV discharge-lamp source for use in broader applications.

In physics and chemistry, a metastable state is an excited state of an atom, nucleus, or other system that has a much longer lifetime than typical excited states. The metastable state also typically has a shorter lifetime than the lowest, most stable, energy state which is typically called the ground state. A metastable state is an intermediate stage of a system where energy of the system may be lost in discrete amounts. In quantum mechanics, transitions from metastable states to lower energy states are dipole-forbidden and thus are much less likely to happen than transitions from other excited states of the system, and therefore, transitions from metastable states may often have to be stimulated via external energy or means.

Figure 1:
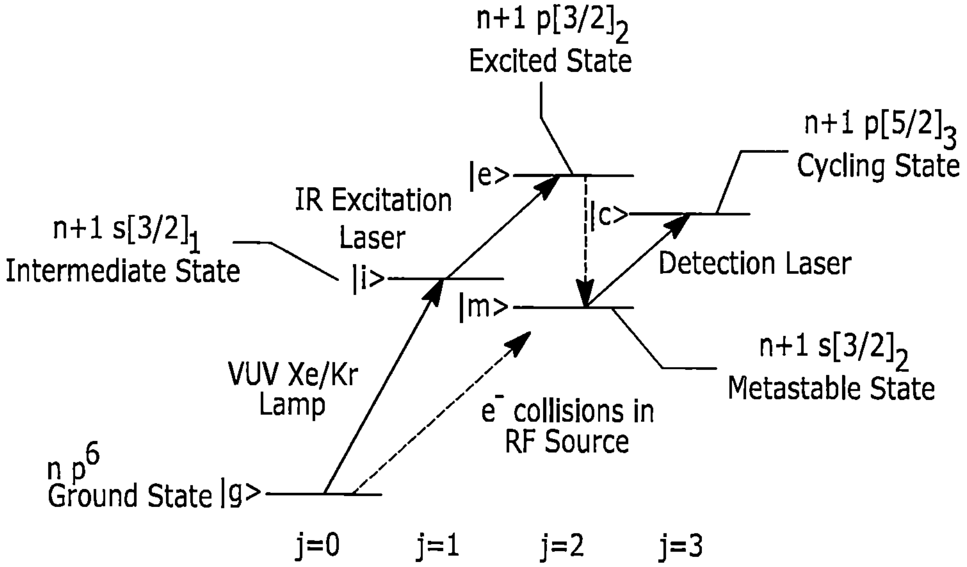
FIG. 1 is a diagram of atomic transitions and states for krypton at atomic shell number n=4, and for xenon at atomic shell number n=5 for demonstrating the population of a metastable atomic state.

FIG. 1 is a diagram of atomic transitions and states for krypton (Kr) at atomic shell number n=4 and xenon (Xe) at atomic shell number n=5. The various possible energy transitions are represented by the arrows in FIG. 1. At stable state, the atom is in a ground state |g>. VUV radiation may be provided by an Xe/Kr VUV lamp to cause excitation of the atom into an intermediate state |i>. Infrared radiation may then be provided to excite the atom to a excited state |e>. The atom then may de-excite into a metastable state |m>, where the atom remains for a period of time. Detection radiation having a specific wavelength may then be provided to excite the atom into the cycling state |c> where it spontaneously emits a photon of the same wavelength and decays back into |m>. This process is repeated millions of times per second, enabling the detection of the spontaneously emitted photons by a photo-diode and therefore detection of the atoms in the metastable state. In another implementation, electron collisions may cause the atom to transition directly from the ground state to the metastable state. The electron collision approach is referred to herein as "discharge excitation" or a "discharge setup."

Described herein are methods and systems for enhanced VUV lamp operation. The enhancements are demonstrated by performing measurements on atomic metastable state population of the n+1 s(3/2)2 state of Kr and Xe. As illustrated in FIG. 1, the all-optical approach to populating the metastable state involves a three-photon process. First, optical pumping of an atom is performed using resonant VUV photons with wavelengths of 123.58 nm for Kr and 146.96 nm for Xe. The radiation may be provided by a VUV lamp with Kr or Xe gas. A 1.2 W Ti:Sapphire laser then provides near infrared (NIR) radiation to the atom and excites the system from the intermediate state to another excited state. The NIR radiation has a wavelength of 819.23 nm for Kr and 895.471 nm for Xe. The final transition to the metastable state occurs due to spontaneous decay from the excited state into the metastable state.

The discharge excitation approach, a non-radiation-based approach, depends on electron collisions which utilizes an electric RF coil to ignite plasma in a chamber. No optical or radiation sources are used to generate a plasma or to excite/de-excite atoms. The discharge excitation approach will be referenced herein to compare the performance of the magnetically enhanced VUV lamp described, and to show improvements over the discharge excitation setups and lamps.

Figure 2:
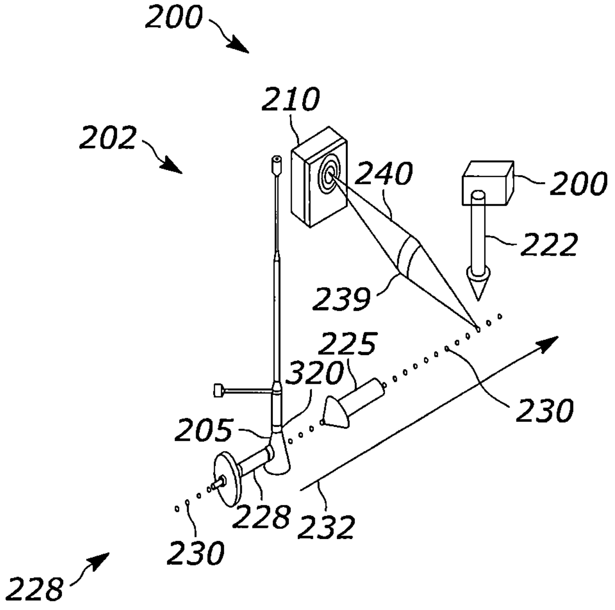
FIG. 2 is a diagram of a system for performing optical excitation and detection of an atomic beam using a vacuum ultraviolet (VUV) lamp.

FIG. 2 is a diagram of a system 200 for performing optical excitation and detection of an atomic beam 228. The atomic beam 228 includes a plurality of atoms 230 traveling along a propagation direction 232. A VUV lamp 202 is disposed to provide output radiation 205 to the atoms 230, IR radiation 225 is provided to the atoms 228 to excite the atoms 230, and a detection laser 220 provides detection radiation 222 to the atoms 230. The VUV lamp 202 has an output window 320 disposed to provide the output radiation 205 along an axis perpendicular to the propagation direction 232 of the atoms 230. The detection radiation 222 repeatedly excites the atoms from the metastable state to a cycling state wherein the atoms de-excite and release a radiation signal in the form of fluorescence 240 that is detected by a photodetector 210. In examples, the atoms 230 may include Xe, Ar, Kr atoms, or another noble gas.

The population of the metastable state of atoms 230 in the atomic beam 228 is measured by probing the cycling transition in Kr at 811.51 nm, or Xe at 882.18 nm. A continuous wave (CW) diode-laser provides the atoms 230 with the probing radiation 222, with the probing radiation tuned to the metastable-to-cycling state transition. Here, the atoms 230 are repeatedly excited and de-excited causing them to brightly fluoresce. One or more optics 239 may focus the fluorescence 240 onto the photodetector 210, and the photodetector 210 detects the fluorescence 240. In implementations, the detection radiation 222 has a 7.8 mm beam diameter and is aligned perpendicularly to the atomic beam 228 at approximately 15 cm from the atomic source along the propagation direction 232.

The system 200 of FIG. 2 is one example of a setup for providing VUV radiation to atoms for populating a metastable state of an atom as described herein. The system 200 of FIG. 2 will be implemented for evaluating and confirming the improvements and performance of the enhanced VUV lamps described.

Figure 3:
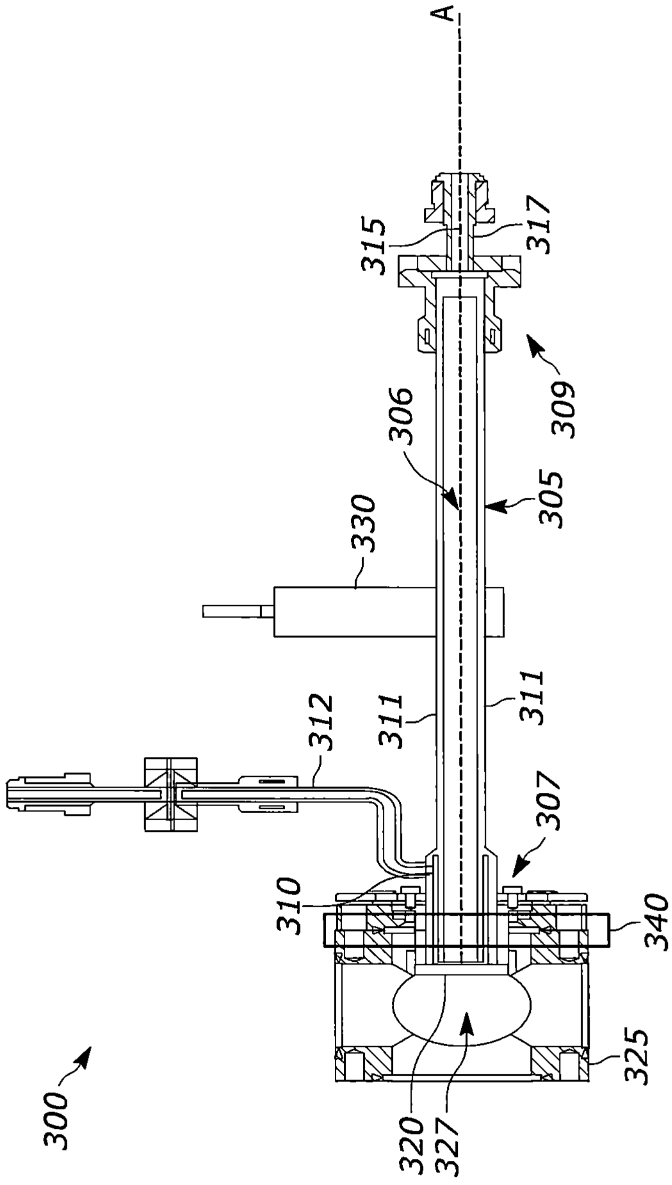
FIG. 3 is a diagram of an enhanced VUV lamp using a magnetic compensator.

FIG. 3 is a diagram of a magnetically enhanced VUV lamp 300. The VUV lamp 300 has a microwave cavity chamber 305 having a first end 307 and a second end 309. The microwave cavity chamber 305 has a hollow core that supports a microwave cavity 306 to generate radiation inside of the microwave cavity chamber 305. In examples, the microwave cavity 306 may be a McCarroll microwave cavity. The microwave cavity 306 may operate at 2.45 GHz and be capable of internally coupling 200 W into the microwave cavity 306. While described as being performed with a microwave cavity, another cavity, such as an Evenson cavity, may be used to fabricate a VUV lamp as described herein. In examples, the microwave cavity chamber 305 may be made of one or more materials including, but not limited to, quartz, Macor, ceramic, $MgF_2$, and/or LiF.

The microwave cavity chamber 305 has a length along a central axis A with the first end 307 disposed at one side of the length of the microwave cavity chamber 305, and the second end 309 disposed at an opposite side of the microwave cavity chamber 305 along the central axis A. The first and second ends 307 and 309 support modes of radiation inside of the microwave cavity 306 for generating and building intensity of radiation inside of the microwave cavity chamber 305.

The microwave cavity chamber 305 has a gas inlet port 310 disposed toward the first end 307 of the microwave cavity chamber 305. The gas inlet port 310 provides a path for fluid flow to be provided into the microwave cavity 306 through an outer wall 311 of the microwave cavity chamber 305. A gas supply system 312 is in fluid communication with the microwave cavity 306 through the gas inlet port 310. The gas supply system 312 provides one or more gasses, or other fluids, to the microwave cavity 306. The gas supply system 312 may include one or more pumps and one or more fluid channels for providing the gas to the microwave cavity 306. During operation, the gas supply system 312 may provide a constant flow of gas to the microwave cavity 306. The gas supply system 312 may additionally control a flow rate of gas into the microwave cavity 306 via manual or electrical control using a stepper valve, or another valve or flow control regime.

A gas outlet port 315 is disposed at the second end 309 of the microwave cavity chamber 305. A gas exhaust system 317 is in fluid communication with the microwave cavity 315 via the gas outlet port 315. The gas exhaust system 315 may include one or more pumps and one or more fluid channels for allowing gas or fluid flow out of the microwave cavity 306. While illustrated as being at the very end of the second end 309 of the microwave cavity chamber 305, the gas outlet port 315 may be disposed toward the second end 309 along the outer wall 311 of the microwave cavity chamber 305.

An output window 320 is disposed at the first end 307 of the microwave cavity chamber 305. The output window 320 transmits radiation from inside of the microwave cavity 306 to an external environment. In the example illustrated in FIG. 3, a vacuum chamber 325 is disposed at the second end 307 of the microwave cavity chamber 305, and the output window 320 is disposed inside of a low-pressure environment 327 inside of the vacuum chamber 325. The output window 320 transmits a portion of radiation generated in the microwave cavity 306, from the microwave cavity 306, into the vacuum chamber 320. The output window 320 may be magnesium fluoride, lithium fluoride, quartz, UV fused silica, sapphire, calcium flouride, or another material transparent to UV radiation. The radiation may then be further manipulated, focused, redirected, or detected using optics and/or detectors. Further, the radiation may be provided to atoms, molecules, or other materials for probing the materials or for exciting/de-exciting the atoms and/or molecules. The radiation may be provided to atoms for populating a metastable state, as described herein.

In examples, one or more pressure sensors, or barometric sensors may be disposed inside of the microwave cavity 306, or inside of one or more fluidic channels of the gas supply system 312 and/or gas exhaust system 317. The one or more pressure sensors may measure fluid flow rate or pressure in the microwave cavity 306. The one or more pressure sensors may directly measure the pressure or flow rate inside of the microwave cavity, or the one or more pressure sensors may be disposed along one or more fluidic channels in fluid communication with the microwave cavity 306 to determine a pressure of the microwave cavity 306. The one or more pressure sensors may provide one or more signals to the gas supply system 312 and/or gas exhaust system 317, the signal being indicative of the fluid flow rate and/or pressure of the microwave cavity 306. The gas supply system 312 and/or gas exhaust system 317 may then control fluid flow into and out of the microwave cavity 306 based on the one or more signals. Additionally, an external processor (not illustrated) or controller may receive the one or more signals and further control the gas supply system 312 and/or gas exhaust system 317.

The VUV lamp 300 may further include a microwave cavity tuning fork 330 disposed along the length of the microwave cavity chamber 305. The microwave cavity tuning fork 330 is physically and electromagnetically coupled to the microwave cavity chamber 305 along the central axis A. The microwave cavity tuning fork 330 provides the ability to tune or adjust one or more resonant frequencies of the microwave cavity 306. Therefore, the microwave cavity tuning fork 330 may be used to tune the energy of radiation generated in, and supported by, the microwave cavity 306.

A magnetic compensator 340 is disposed toward the first end 307 of the microwave cavity chamber 305. The magnetic compensator 340 may be physically attached to the vacuum chamber 325 and/or the microwave cavity chamber 305. In examples, the magnetic compensator 340 may not be physically coupled to the microwave cavity chamber 305, and the magnetic compensator 340 may be mounted near or proximal to the first end 307 of the microwave cavity chamber 305 by external mounts. Additionally, the magnetic compensator 340, or components of the magnetic compensator 340, may be physically coupled to one or more motors, actuators, or translation stages to control a position and/or orientation of the magnetic compensator 340, or elements and components of the magnetic compensator 340.

Figure 4A:
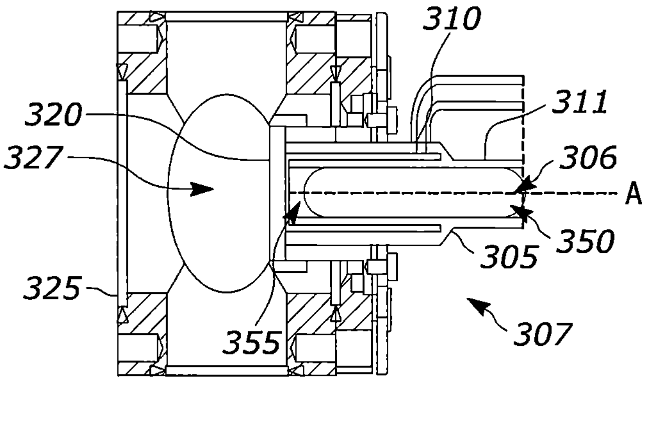
FIG. 4A is a close up side-view of a first end of a microwave cavity chamber of a VUV lamp without inclusion of a magnetic compensator.

The magnetic compensator 340 includes one or more magnetic field sources positioned relative to the first end 307 of the microwave cavity chamber 305 to provide a magnetic field to the first end 307 of the microwave cavity 306. FIG. 4A is a close up side view of the first end 307 of the microwave cavity chamber 305 without inclusion of the magnetic compensator 340. In FIG. 4A, a plasma 350 is generated inside of the microwave cavity 306. The plasma 340 is generated by providing a gas to the microwave cavity 306 via the gas inlet port 310, and then exciting the gas using a tesla coil to form the plasma. As illustrated in FIG. 4A, the plasma 350 typically does not extend fully to the output window 320 for low pressures, which results in an absence of plasma in an end region 355 of the microwave cavity 306. The absence of plasma 350 in the end region 355 results in lower radiation output of the VUV lamp.

Figure 4B:
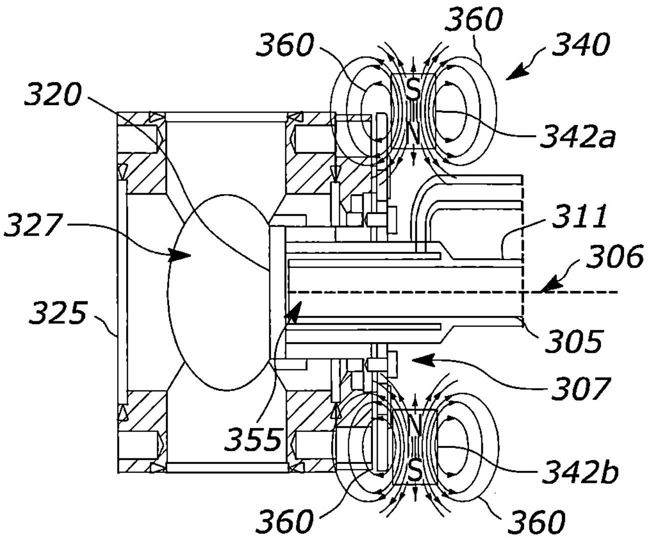
FIG. 4B is a close up side-view of the of the first end of the microwave cavity chamber of FIG. 4A, with the inclusion of a magnetic compensator with two compensator magnets.

FIG. 4B is a close up side-view of the of the first end 307 of the microwave cavity chamber 305 with the magnetic compensator 340 including two compensator magnets 342*a* and 342*b*. The compensator magnets 342*a* and 342*b* are disposed relative to the first end 307 of the microwave cavity chamber 305 to provide magnetic fields, illustrated as magnetic field lines 360, to the plasma 350. The presence of the magnetic fields causes the plasma 350 to extend further into the end region 355 toward the output window 320, causes the brightness of the plasma to increase, and improves the stability of the plasma modes that maximize narrower band VUV output. Filling the end region 355 with the plasma 350 results in decreased self-absorption before light exits the window 320 and therefore increased output radiation intensity. The decreased self-absorption also enables output of narrower band VUV radiation for a given lamp brightness. The magnetic fields also reduce the likelihood that the plasma 350 will jump to lower neighboring resonance modes of the microwave cavity chamber 305, thereby improving stability of the mode with maximized output VUV intensity.

Figure 4C:
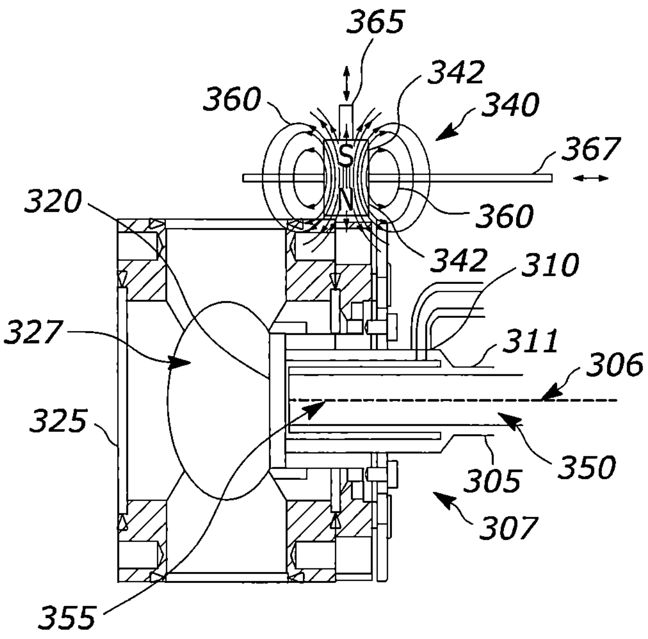
FIG. 4C is a close up side-view of the first end of the microwave cavity chamber of FIG. 4A with the inclusion of a magnetic compensator with a single compensator magnet.

FIG. 4C is a close up side-view of the first end 307 of the microwave cavity chamber 305 with the magnetic compensator 340 having only a single compensator magnet 342. The single compensator magnet 342 may provide enough magnetic field to the plasma 350 to cause the plasma 350 to occupy more of the end region 355 of the microwave cavity chamber 305. While illustrated as including one or two magnets, the magnetic compensator 340 may include more than two magnets. Additionally, a person of ordinary skill in the art would recognize that the magnetic field lines continue to exist further from the magnets 342, 342*a*, and 342*b* than illustrated in FIGS. 4B and 4C. The additional field lines, and portions of field lines, have been omitted for simplicity and clarity. As such, the compensator magnets 342, 342*a*, and 342*b* provide magnetic fields to the plasma 350, and the end region 355 of the microwave cavity chamber 305.

The compensator magnets 342, 342*a*, and/or 342*b* may include one or more permanent magnets such as rare earth magnets, ferrite magnets, ceramic magnets, neodymium iron boron magnets, alnico magnets, samarium cobalt magnets, injection molded magnets, or flexible magnets. In examples, the compensator magnets 342, 342*a*, and/or 342*b* may include one or more temporary magnets. The compensator magnets 342, 342*a*, and/or 342*b* may include one or more electromagnets that use electric current to generate magnetic fields. In such an implementation, the electric current may be tuned to control and tune the strength of the generated magnetic field. In examples, a plurality of electromagnets may be positioned at one or more locations and orientations around the first end 307 of the microwave cavity chamber 305 and the strength of each electromagnet may be tuned to provide a same or different magnetic field strength to the microwave cavity 306. In examples, the magnetic compensator 340 may provide a magnetic field strength of greater than 10 gauss, greater than 20 gauss, greater than 50 gauss, between 10 and 50 gauss, between 20 and 50 gauss, between 20 and 100 gauss, or at least 20 gauss to the microwave cavity chamber 305.

The strength of the magnetic field provided to the plasma and/or end region 355 may be controlled by tuning a position and orientation of the compensator magnets 342, 342*a*, and/or 342*b*. As illustrated in FIG. 4C, the magnetic compensator 342 may further include one or more actuators 365 and 367. The compensator magnet 342 may be physically coupled to a horizontal actuator 367 and a vertical actuator 365. The horizontal actuator 367 may control a position of the compensator magnet 342 along the left and right directions in the plane of the page, and the vertical actuator 365 may control the position of the compensator magnet 342 along the up and down directions in the plane of thew page. The magnetic compensator 340 may further include actuators to control the position of the compensator magnet 342 into and out of the plane of the page. Further, rotational actuators or motors may be used to control the orientation of the poles of the compensator magnet 342 relative to the microwave cavity chamber 305 and the end region 355.

The performance and stability of a magnetically compensated VUV lamp was demonstrated, according to the setup illustrated in FIG. 2, using the optical excitation setup for populating a metastable atomic state. The performance of the lamp was demonstrated with, and without, the addition of the magnetic compensator 342. The atoms 230 were generated by flowing Xe or Kr into a vacuum chamber, such as the vacuum chamber 325 of FIGS. 3, 4B, and 4C. The Xe or Kr was provided to the vacuum chamber through a capillary array 228 having a 1.3 cm diameter, with the capillary array 228 being half open by area. The capillary array 228 consisted of densely packed 2.5 mm length tubes each with 25 um diameters. As illustrated in FIG. 2, the output window 320 of the VUV lamp is positioned to provide the output radiation 205 along a direction that is perpendicular to the propagation of the atoms 230. Excitation of the atoms 230 occurs after the atoms exit of the capillary array 228 into the vacuum chamber 325. The IR radiation 225 counter-propagates relative to the propagation direction of the atoms 230. The IR radiation 225 is focused such that it completely covers the entire capillary array 228. The plasma was generated in the VUV lamp using a McCarroll-type microwave cavity with a resonance at 2.45 GHz.

For comparison, the performance of a discharge lamp setup was also demonstrated. For the discharge setup measurements, Xe or Kr gas flows through a 17.5 cm long quartz tube with a 1.05 cm inner diameter as a discharge is applied. For the discharge setup, electron collision is used to populate the metastable state, instead of using the output radiation 205 and the IR radiation 225. The detection of the metastable state, using the detection radiation 222 and photodetector 210, is the same for both the optical excitation and discharge setups.

The magnetic compensator 340 included a neodymium rare earth magnet to achieve the performance enhancements described herein. The neodymium permanent magnet was disposed approximately 6 cm±1 cm from the center of the lamp window 320, with the center of the lamp window 320 along the axis A. The magnetic field strength provided by the neodymium permanent magnet was determined to be between 20 gauss (G) and 40 G inside of the microwave cavity chamber 305. As described herein, the inclusion of the magnetic compensator 340 improved plasma mode stability, increased output radiation brightness, and increased atomic metastable state production.

To form a plasma in the microwave cavity chamber 305, an external tesla coil provided a discharge to gas in the microwave cavity 306. The generated VUV light exited the microwave cavity 306 via the output window 320 which was a 25 mm diameter, 5 mm thick MgF2 window facing perpendicularly to the propagation of the atoms 230 near the exit of the capillary array 228. The VUV 300 lamp was housed inside a Faraday cage and mounted in a reentrant flange enabling the flux of the output radiation 205 to be closer to the atoms 230. The microwave cavity chamber 305 was fabricated from quartz and had outer diameter of 19 mm and inner chamber diameter of 12.5 mm. The gas supply system 312 included a glass stem at the gas inlet port 310 to supply gas to the microwave cavity 306. The gas was pumped out of the inner quartz cavity chamber through the gas outlet port 315 to provide a continual flow of gas through the microwave cavity chamber 305. The continuous flow of gas may reduce contaminant build up at the output window 320 which may preserve transmissivity of the output radiation 205 through the output window 320 over extended operation. The gas supply system 312 used an electronically controlled stepper valve to control the flow rate of the gas through the microwave cavity chamber 305. The electronically controlled stepper valve was physically coupled to an input of a turbomolecular pump to control modulation of the flow rate of the gas. The pressure in the microwave cavity chamber 305 was determined using barometric pressure readings from pressure sensors (e.g., sensors at the gas inlet and outlet ports 310 and 315), and by estimating relative conductance before and after the lamp. The microwave cavity 306 is isolated from the low pressure environment 327 of the vacuum chamber 325 using a 1.5 mm diameter indium wire as a mechanical gasket or seal, along with a threaded cap to mount the output window 320 to the vacuum chamber 325.

Figure 5:
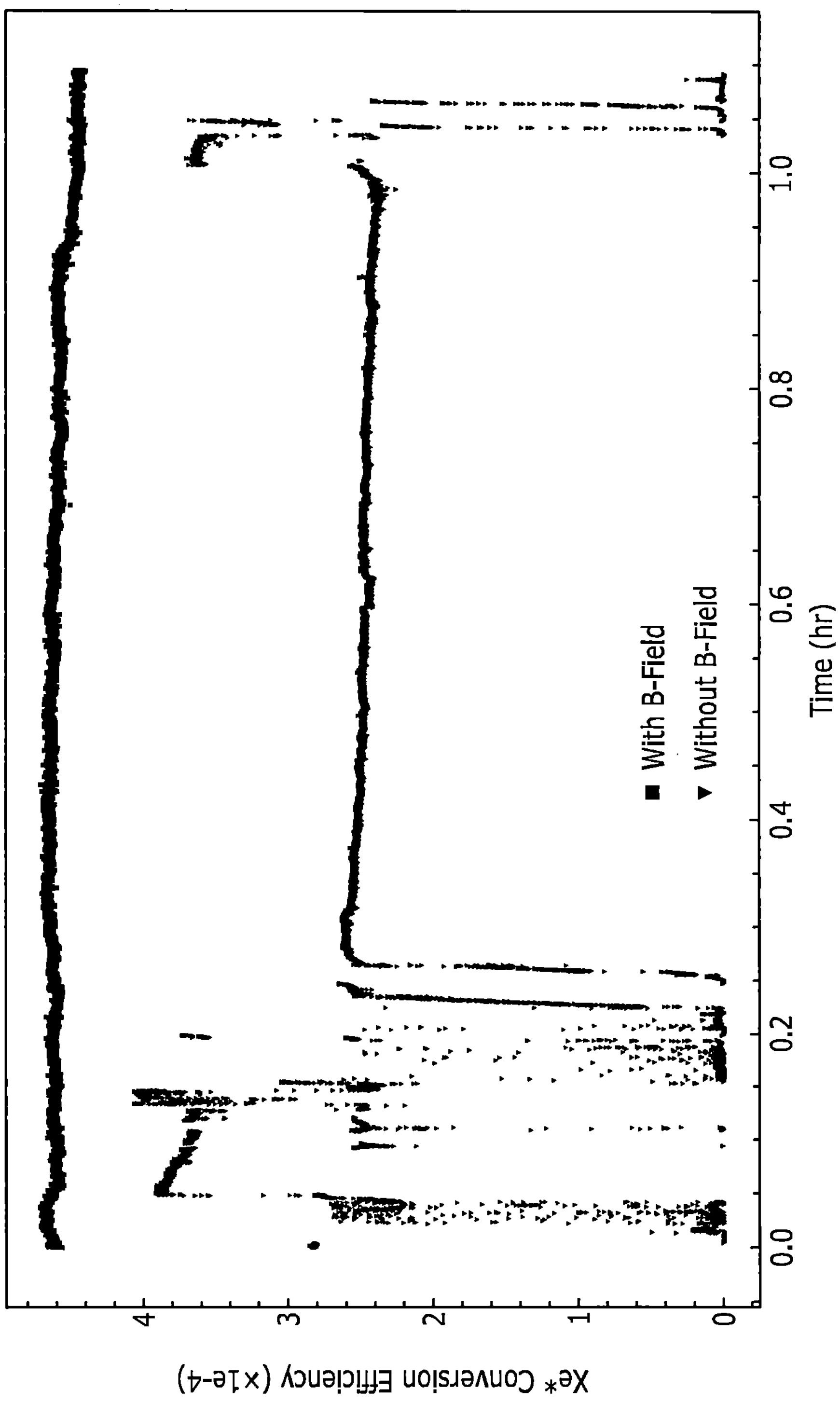
FIG. 5 is a plot of Xe metastable state conversion efficiency over time for the system of FIG. 2 with, and without, use of a magnetic compensator.

FIG. 5 is a plot of Xe metastable state conversion efficiency for the system 200 of FIG. 2, with, and without, the use of a neodymium rare earth magnet as a magnetic compensator. The VUV lamp was operated near the optimal Xe partial pressure of 6 mTorr with ~140 W of coupled microwave power in the microwave cavity of the VUV lamp. The determined optimized partial pressure for Xe was determined by balancing (i) the self-absorption broadening caused by ground-state noble gases near the output window, and (ii) the reduced number of emitters at lower pressures. As illustrated by the data of FIG. 5, without the use of a magnetic compensator (i.e., without B-field data), the plasma mode exhibited both a stable mode and an unstable mode of operation. The stability was particularly unstable at low internal cavity pressures. A krypton buffer gas with ~5 mTorr partial pressure was provided into the microwave cavity to assist with preventing the plasma mode from spontaneously extinguishing. However, the addition of more krypton gas led to instability in the plasma modes with maximum VUV output. Therefore, the maximum signal achieved without the magnet was typically unstable making the highest output intensity mode of the VUV lamp an impractical radiation source for various applications. With the magnetic compensator, the brightness of the plasma mode in the microwave cavity increased, and the contact of the plasma with the output window increased, thereby reducing self-absorption. The data of FIG. 5 shows increased Xe metastable conversion with the use of the magnetic compensator, and further maintained the plasma in a single stable mode, instead of the plasma jumping between stable and unstable modes. The maximum stable output of the VUV lamp may depend on the positions and orientations of magnets of the magnetic compensator.

For the data of FIG. 5 recorded without the B-field, the VUV lamp is operated without a magnetic compensator for more than an hour. In the first 15 minutes and last 6 minutes of this period there was a repeated effort to tune the cavity to the mode with the maximum signal. The plasma mode with the greatest signal is extremely unstable and quickly hops to another mode with less signal resulting in the many large peaks and valleys shown in the without B-field data of FIG. 5. The maximum VUV output from a stable plasma mode is demonstrated in the 45 minutes between the two attempts to demonstrate the maximum VUV output. For the data with a B-field, a magnetic compensator was provided to the VUV lamp as described herein. The VUV lamp then performs with much more stability as evidenced by the absence of large valleys in the data during more than an hour of operation. The data of FIG. 5 shows a high level improvement of VUV lamp stability and overall increased signal output using a magnetic compensator. While only about 1.1 hours of data is illustrated in FIG. 5, including the magnetic compensator allowed the lamp to operate with stable output for up to 7 hours, and it is envisioned, that it could perform with stable operation for even longer durations.

Frequently, after extended stable operation, the signal output would drift to smaller signals (e.g. in FIG. 5). Typically, however, at the end of the data taking, the microwave cavity was reoptimized (e.g., tuning forks, output power) and the maximum signal was recovered. The ability to recover the maximum signal output indicates that the decrease of signal during operation was not permanent, such as by contamination. The drifts during operation may be due to lamp pressure and lamp and cavity temperature drifts during operation that modify the optimal cavity settings.

Figure 6:
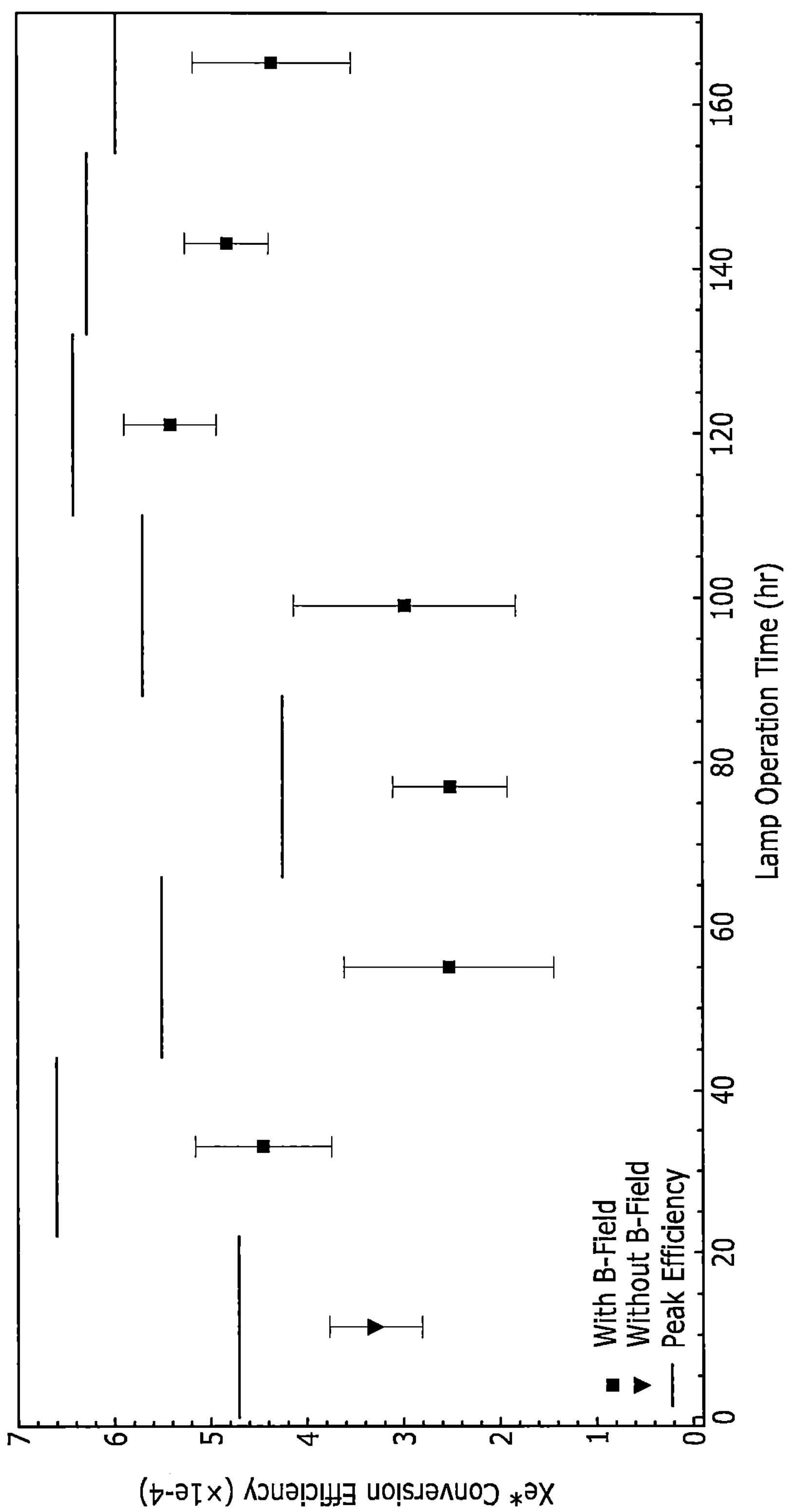
FIG. 6 is a plot of Xe metastable state conversion efficiency vs. lamp operation time over 166 hours.

FIG. 6 is a plot of Xe metastable state conversion efficiency vs. lamp operation time over 166 hours. The data shows the peak efficiency and mean efficiency for each time bin. The mean efficiencies were calculated using data collected only during stable operation in 22-hour lamp operation time bins. Stable operation is defined to be 5 consecutive minutes or more of signal with less than 5% variation from point to point. This definition of stable operation is used to distinguish data from periods where manual tuning or laser mode hopping occurred. The VUV lamp performed under stable operation for more than half of the total operation time. The microwave power and cavity tuning forks were optimized for maximum output from the VUV lamp and the vacuum chamber pressure was kept at a constant 1e-5 Torr to avoid beam flux and pressure dependent changes in efficiency. Typically, the lamp operated with 100-140 W of output microwave radiation power with a partial pressure between 6 and 10 mTorr. The first 22 hour period measurement is performed without a magnetic compensator, with the rest of the 22 hour periods including the magnetic compensator.

No significant degradation of the output of the VUV lamp was observed over the 166 hours of operation. During the operation of the lamp, thin film interference effects were observed on the output window suggesting a thin circular film of quartz may have deposited, albeit not enough to see significant reduction in VUV transmission. X-ray spectroscopy scans of the window found no additional elements besides silicon and oxygen indicating that other contaminants had successfully been removed and prevented from depositing in the window. Difficulty rotating the threads of the tuning fork threads due to repeated heating cycles appeared between 30 and 80 hours of lamp operation and may have contributed to the reduced metastable output observed over that period.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A system for generating ultra-violet radiation, the system comprising: a microwave cavity chamber having a first end and a second end, the second end opposite the first end along a central axis of the microwave cavity chamber and (i) a gas inlet port disposed toward the first end of the microwave cavity chamber, the gas inlet port configured to allow fluid flow into the microwave cavity chamber, (ii) a gas outlet port disposed toward the second end of the microwave cavity chamber, the gas outlet port configured to provide fluid flow out of the microwave cavity chamber; and (iii) an output window at the first end of the microwave cavity chamber, the output window configured to transmit radiation generated in the microwave cavity chamber; and a compensator magnet disposed proximal the first end of the microwave cavity chamber to provide an external magnetic field to the first end of the microwave cavity chamber.

2. The system of aspect 1, further comprising, a vacuum chamber disposed at the first end of the microwave cavity chamber with the output window disposed inside of the vacuum chamber to transmit radiation from the microwave cavity chamber to the vacuum chamber.

3. The system of either aspect 1 or 2, wherein the compensator magnet comprises a permanent magnet.

4. The system of any of aspects 1 to 3, wherein the compensator magnet comprises an electromagnetic magnet.

5. The system of aspect 4, wherein the electromagnetic magnet has a tunable electromagnetic field strength.

6. The system of any of aspects 1 to 5, wherein the compensator magnet comprises a plurality of magnets.

7. The system of any of aspects 1 to 6, wherein the compensator magnet provides a magnetic field of at least 20 gauss, or between 20 and 50 gauss.

8. The system of any of aspects 1 to 7, further comprising an actuator physically coupled to the compensation magnet, the actuator configured to move the compensation magnet along the central axis of the microwave cavity chamber.

9. The system of any of aspects 1 to 8, further comprising a microwave cavity tuning fork disposed along the central axis of the microwave cavity chamber, the microwave cavity tuning fork configured to tune a resonance of a microwave cavity formed in the microwave cavity chamber.

10. The system of any of aspects 1 to 9, wherein the output window comprises magnesium fluoride, or lithium fluoride.

11. A method of generating radiation, the method comprising: providing a microwave cavity chamber with a gas, the microwave cavity chamber having (i) a length along a central axis of the microwave cavity chamber, (ii) a first end along the central axis, and (iii) a second end opposite the first end along the central axis; providing excitation energy to the microwave cavity camber and generating a plasma in the microwave cavity chamber; and providing, by a compensation magnet, a compensation magnetic field at the first end of the microwave cavity chamber.

12. The method of aspect 10, wherein providing the compensation magnetic field comprises providing the compensation magnetic field by a permanent magnet.

13. The method of either aspect 10 or aspect 11, wherein providing the compensation magnetic field comprises providing the compensation magnetic field by an electromagnetic magnet.

14. The method of aspect 13, wherein the electromagnetic magnet has a tunable magnetic field strength.

15. The method of any of aspects 10 to 14, wherein the compensation magnet comprises a plurality of magnets.

16. The method of any of aspects 10 to 15, further comprising tuning the position of the compensation magnet relative to first end of the microwave cavity chamber to tune the compensation magnetic field provided at the first end of the microwave cavity chamber.

17. The method of any of aspects 10 to 16, further comprising tuning, by a microwave tuning fork, a resonance of the microwave cavity chamber.

18. The method of any of aspects 10 to 17, coupling, via an output window at the first end of the microwave cavity chamber, radiation from the microwave cavity chamber into a vacuum chamber.

19. The method of any of aspects 10 to 18, wherein the output window comprises magnesium fluoride, or lithium fluoride.

20. The method of any of aspects 10 to 19, wherein the compensation magnetic field has a field strength of at least 20 gauss, or between 20 and 50 gauss.

What is claimed is:

1. A system for generating ultra-violet radiation, the system comprising: a microwave cavity chamber having a first end and a second end, the second end opposite the first end along a central axis of the microwave cavity chamber and (i) a gas inlet port disposed toward the first end of the microwave cavity chamber, the gas inlet port configured to allow fluid flow into the microwave cavity chamber, (ii) a gas outlet port disposed toward the second end of the microwave cavity chamber, the gas outlet port configured to provide fluid flow out of the microwave cavity chamber, and (iii) an output window at the first end of the microwave cavity chamber, the output window transmits optical radiation generated in the microwave cavity chamber; and a compensator magnet disposed proximal the first end of the microwave cavity chamber to provide an external magnetic field to the first end of the microwave cavity chamber.

2. The system of claim 1, further comprising, a vacuum chamber disposed at the first end of the microwave cavity chamber with the output window disposed inside of the vacuum chamber to transmit radiation from the microwave cavity chamber to the vacuum chamber.

3. The system of claim 1, wherein the compensator magnet comprises a permanent magnet.

4. The system of claim 1, wherein the compensator magnet comprises an electromagnetic magnet.

5. The system of claim 4, wherein the electromagnetic magnet has a tunable magnetic field strength.

6. The system of claim 1, wherein the compensator magnet comprises a plurality of magnets.

7. The system of claim 1, wherein the compensator magnet provides a magnetic field of at least 20 gauss.

8. The system of claim 1, further comprising an actuator physically coupled to the compensator magnet, the actuator configured to move the compensator magnet along the central axis of the microwave cavity chamber.

9. The system of claim 1, further comprising a microwave cavity tuning fork disposed along the central axis of the microwave cavity chamber, the microwave cavity tuning fork configured to tune a resonance of a microwave cavity formed in the microwave cavity chamber.

10. The system of claim 1, wherein the output window comprises magnesium fluoride, lithium fluoride, quartz, UV fused silica, or calcium fluoride.

11. A method of generating radiation, the method comprising: providing a microwave cavity chamber with a gas, the microwave cavity chamber having (i) a length along a central axis of the microwave cavity chamber, (ii) a first end along the central axis including an output window that transmits optical radiation, and (iii) a second end opposite the first end along the central axis; providing excitation energy to the microwave cavity chamber and generating a plasma in the microwave cavity chamber; and providing, by a compensation magnet, a compensation magnetic field at the first end of the microwave cavity chamber.

12. The method of claim 11, wherein providing the compensation magnetic field comprises providing the compensation magnetic field by a permanent magnet.

13. The method of claim 11, wherein providing the compensation magnetic field comprises providing the compensation magnetic field by an electromagnetic magnet.

14. The method of claim 13, wherein the electromagnetic magnet has a tunable magnetic field strength.

15. The method of claim 11, wherein the compensation magnet comprises a plurality of magnets.

16. The method of claim 11, further comprising tuning the position of the compensation magnet relative to the first end of the microwave cavity chamber to tune the compensation magnetic field provided at the first end of the microwave cavity chamber.

17. The method of claim 11, further comprising tuning, by a microwave tuning fork, a resonance of the microwave cavity chamber.

18. The method of claim 11, coupling, via an output window at the first end of the microwave cavity chamber, radiation from the microwave cavity chamber into a vacuum chamber.

19. The method of claim 11, wherein the output window comprises magnesium fluoride, lithium fluoride, quartz, UV fused silica, or calcium fluoride.

20. The method of claim 11, wherein the compensation magnetic field has a field strength of at least 20 gauss.

* * * * *